US009562560B1

(12) United States Patent
Salton et al.

(10) Patent No.: US 9,562,560 B1
(45) Date of Patent: Feb. 7, 2017

(54) ROBUST TILT AND LOCK MECHANISM FOR HOPPING ACTUATOR

(71) Applicant: Sandia Corporation, Albuquerque, NM (US)

(72) Inventors: Jonathan R. Salton, Albuquerque, NM (US); Stephen Buerger, Albuquerque, NM (US); Kevin J. Dullea, Albuquerque, NM (US); Lisa C. Marron, Albuquerque, NM (US); Curt Michael Salisbury, San Ramon, NM (US); Barry Louis Spletzer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 56 days.

(21) Appl. No.: 14/070,939

(22) Filed: Nov. 4, 2013

(51) Int. Cl.
*A63H 11/06* (2006.01)
*A63H 17/00* (2006.01)
*F16C 11/10* (2006.01)
*B62D 57/02* (2006.01)

(52) U.S. Cl.
CPC .............. *F16C 11/10* (2013.01); *A63H 11/06* (2013.01); *A63H 17/004* (2013.01); *B62D 57/02* (2013.01)

(58) Field of Classification Search
CPC ............ F16H 63/3408; F16H 363/3425; F16H 363/3491; F16H 363/34; A63H 11/06; A63H 17/004
USPC .... 180/199, 8.3; 901/1, 8, 14; 446/308, 311, 446/312, 429, 437; 74/577 M, 523
See application file for complete search history.

(56) References Cited

U.S. PATENT DOCUMENTS

| 3,452,473 A | * | 7/1969 | Convertine | A63H 11/06 446/100 |
| 4,308,686 A | * | 1/1982 | Ikeda | A63H 13/02 446/158 |
| 4,483,494 A | * | 11/1984 | Takada | B60R 22/44 242/372 |
| 4,490,124 A | * | 12/1984 | Ogawa | A63H 17/004 446/464 |
| 4,629,250 A | * | 12/1986 | Tezuka | B60N 2/2252 297/362 |
| 4,837,645 A | * | 6/1989 | Miyamoto | G11B 15/6656 360/85 |
| 4,907,757 A | * | 3/1990 | Rumpf | B60R 22/44 242/385.4 |

(Continued)

FOREIGN PATENT DOCUMENTS

WO    WO 9939794 A1 *  8/1999  ............. A63H 11/06

*Primary Examiner* — Joseph Rocca
*Assistant Examiner* — Daniel Yeagley
(74) *Attorney, Agent, or Firm* — Daniel J. Jenkins (57) ABSTRACT

A tilt and lock apparatus that includes a tilt servomechanism, a spiral torsion spring, a lock wheel, and a lock hook is described herein. The spiral torsion spring is mechanically coupled to the tilt servomechanism and the lock wheel (which includes an opening). When a shaft is positioned through the opening, rotation of the lock wheel is in unison with rotation of the shaft. An external surface of the lock wheel includes one or more grooves. The lock hook includes a head that engages and disengages the grooves. The lock wheel is stationary when the head engages one of the grooves and is rotatable when the head disengages the grooves. The head and the grooves are geometrically aligned when engaged to prevent creation of a force that acts to disengage the head responsive to an applied force acting on the shaft.

13 Claims, 7 Drawing Sheets

(56) References Cited

U.S. PATENT DOCUMENTS

| | | | | |
|---|---|---|---|---|
| 5,303,610 | A * | 4/1994 | Noel | B60T 7/105 |
| | | | | 74/523 |
| 6,419,068 | B1 * | 7/2002 | Stephan | B60T 1/005 |
| | | | | 192/219.5 |
| 6,502,657 | B2 * | 1/2003 | Kerrebrock | B25J 9/08 |
| | | | | 180/218 |
| 6,763,552 | B1 | 7/2004 | Kitamura et al. | |
| 7,458,549 | B2 | 12/2008 | Oddsen, Jr. | |
| 7,464,775 | B2 * | 12/2008 | Clemens | B60K 7/0007 |
| | | | | 180/8.1 |
| 8,418,319 | B2 | 4/2013 | Nagami | |
| 2007/0270976 | A1 * | 11/2007 | DeHarde | A61F 5/0125 |
| | | | | 623/27 |
| 2010/0243357 | A1 * | 9/2010 | Yim | B25J 5/007 |
| | | | | 180/218 |
| 2010/0307288 | A1 * | 12/2010 | Lubman | B60R 21/02 |
| | | | | 74/577 M |
| 2013/0026806 | A1 * | 1/2013 | Yamada | B60N 2/1615 |
| | | | | 297/311 |

\* cited by examiner

ROBUST TILT AND LOCK MECHANISM FOR HOPPING ACTUATOR

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

In various applications, shafts are mechanically coupled to a payload, where the shafts are desirably rotated to tilt the payload. However, external forces applied to a payload can damage an apparatus that rotates the shaft as well as the payload itself.

By way of example, a wheeled hopping robotic vehicle can include a hopping actuator (e.g., a payload). The hopping actuator can be stored in a home position in line with a chassis of the hopping robotic vehicle to enable the hopping robotic vehicle to drive. In preparation for deployment of the hopping actuator, the hopping actuator can be tilted. The hopping actuator can be deployed to cause the hopping robotic vehicle to propel off the ground. For instance, the hopping actuator can be a piston cylinder. Fuel and oxidizer can be metered into the hopping actuator and ignited, which causes a foot to extend from the bottom of the cylinder, thereby propelling the hopping robotic vehicle upwards from the ground. The force generated during hopping can cause damage to conventional mechanisms utilized to tilt the hopping actuator.

Moreover, the hopping actuator can be returned to the home position while in the air. If the hopping actuator fails to return to the home position prior to returning to the ground, significant applied forces can be exerted on the hopping actuator. Such applied forces commonly damage the conventional mechanisms utilized to tilt the hopping actuator.

SUMMARY

Described herein are various technologies that pertain to tilting and locking a payload mechanically coupled to a shaft. A tilt and lock apparatus includes a tilt servomechanism, a spiral torsion spring, a lock wheel, and a lock hook. The spiral torsion spring can be mechanically coupled to the tilt servomechanism. Moreover, the lock wheel can be mechanically coupled to the spiral torsion spring. The lock wheel includes an internal surface and an external surface. The internal surface of the lock wheel defines an opening through the lock wheel, where a shaft can be positionable through at least a portion of the opening. When the shaft is positioned through the opening (or a portion thereof), rotation of the lock wheel is in unison with rotation of the shaft about an axis of the shaft. The external surface of the lock wheel includes one or more grooves. Additionally, the lock hook includes a head that engages and disengages the one or more grooves of the lock wheel. The lock wheel is stationary when the head engages one of the one or more grooves of the lock wheel. Further, the lock wheel is rotatable when the head disengages the one or more grooves of the lock wheel. The head and the one or more grooves of the lock wheel are geometrically aligned when engaged to prevent creation of a force that acts to disengage the head responsive to an applied force acting on the shaft.

The tilt and lock apparatus can receive the shaft that is mechanically coupled to the payload. The shaft can be positioned through at least a portion of the opening through the lock wheel and can directly engage the lock wheel (e.g., the shaft and the lock wheel can be mechanically coupled when the shaft is positioned through at least the portion of the opening). Accordingly, the lock wheel and the shaft rotate in unison about the axis of the shaft.

In accordance with various embodiments, the tilt and lock apparatus can further include a locking servomechanism, an arm member, a coupler, and a pin. The locking servomechanism can be mechanically coupled to the arm member, and the arm member can be mechanically coupled to the coupler. The coupler can further include an aperture, where the pin is slidable through the aperture of the coupler. Moreover, a first end of the pin can be mechanically coupled to a lag side of the head of the lock hook. The tilt and lock apparatus can further include a compression spring; the compression spring can be wrapped around at least a portion of the pin (e.g., between the head of the lock hook and the coupler). The compression spring can create a force that acts to engage the head in a groove on the external surface of the lock wheel when the arm member is rotated towards the lock wheel by the locking servomechanism.

According to various embodiments described herein, the tilt and lock apparatus can be included in a hopping robotic vehicle. For instance, the hopping robotic vehicle can include a chassis, a hopping actuator, a shaft mechanically coupled to the hopping actuator, and the tilt and lock apparatus. The tilt and lock apparatus can be mounted on the chassis of the hopping robotic vehicle. However, it is contemplated that the tilt and lock apparatus can be utilized with other types of payloads that are mechanically coupled to the shaft rather than a hopping actuator. Moreover, it is to be appreciated that the tilt and lock apparatus can be included in other types of devices other than a hopping robotic vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to tilting and locking a payload mechanically coupled to a shaft are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein is a tilt and lock apparatus that can rotate a shaft that is mechanically coupled to a payload. Various examples set forth herein pertain to the payload being a hopping actuator, which can propel a hopping robotic vehicle from the ground; yet, it is to be appreciated that the payload is not so limited (e.g., the payload can be a camera or substantially any other payload that can be desirably tilted as described herein).

According to an example where the payload is a hopping actuator, the hopping actuator can be stored in a home position in line with a chassis of a hopping robotic vehicle. Before hopping, the tilt and lock apparatus can tilt the hopping actuator to a desired launch angle and lock the hopping actuator in place throughout the hopping impulse. The tilt and lock apparatus can be locked by engaging a head of a lock hook with a groove on an external surface of a lock wheel as described in greater detail herein. Once airborne (e.g., after retraction of a foot of the hopping actuator), the hopping actuator can be returned to the home position; thus, the tilt and lock apparatus can be unlocked, the hopping actuator can be rotated back to the home position, and the tilt and lock apparatus can again be locked upon reaching the home position. The foregoing desirably occurs in less time than a total flight time of the hopping robotic vehicle, otherwise external forces can be exerted on the hopping actuator. If the hopping robotic vehicle hits the ground prior to the tilt and lock apparatus again being locked, a spiral torsion spring can provide compliance (e.g., to protect the hopping actuator and/or a tilt servomechanism). Moreover, the tilt and lock apparatus can handle significant forces caused by hopping as such loads pass directly through the tilt and lock apparatus. Further, the head of the lock hook and the groove of the lock wheel are geometrically aligned so that hopping forces do not create forces that act to unlock the tilt and lock apparatus.

Figure 1:
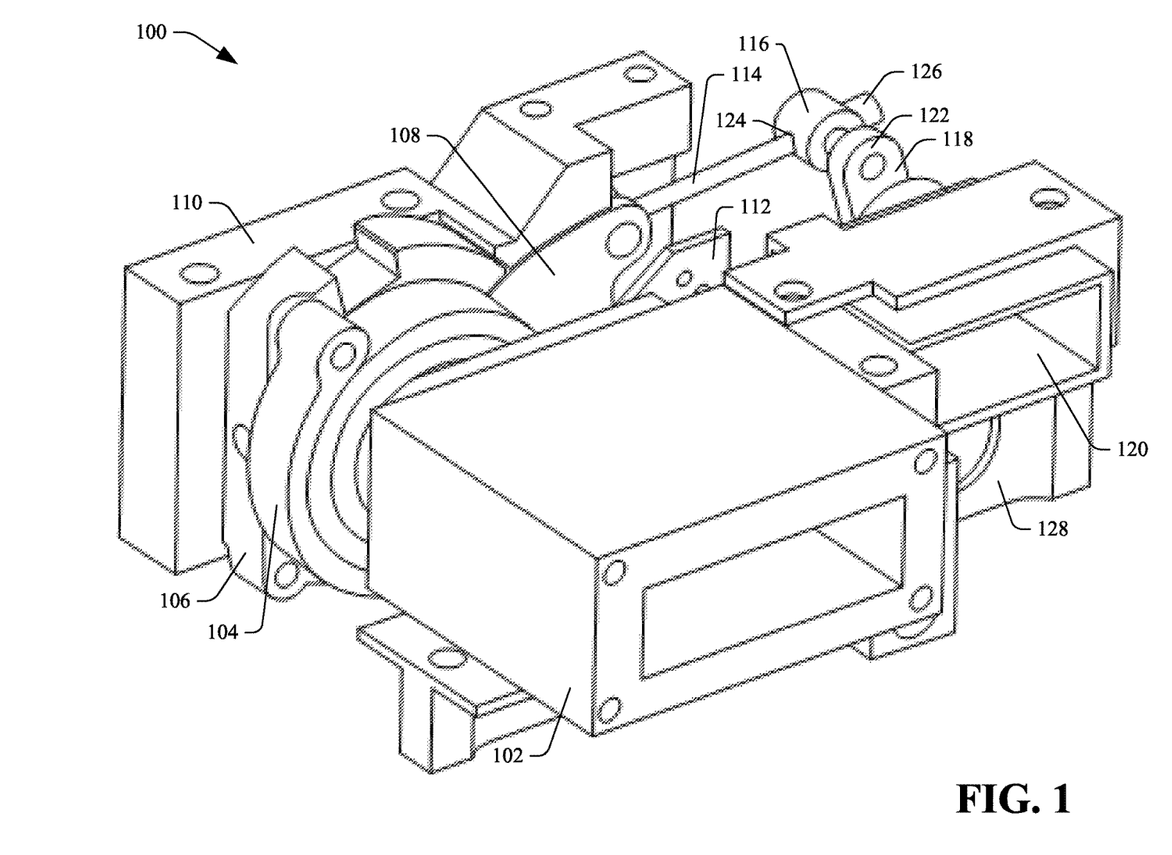
FIG. 1 illustrates an isometric view of an exemplary tilt and lock apparatus.

Referring now to the drawings, FIG. 1 illustrates an isometric view of a tilt and lock apparatus 100. The tilt and lock apparatus 100 includes a tilt servomechanism 102, a spiral torsion spring 104, a lock wheel 106, and a lock hook 108. The tilt servomechanism 102 is mechanically coupled to the spiral torsion spring 104. Accordingly, the tilt servomechanism 102 can drive the spiral torsion spring 104 (e.g., rotate the spiral torsion spring 104). For example, the tilt servomechanism 102 (e.g., an output shaft of the tilt servomechanism 102) can directly engage an inner end of the spiral torsion spring 104.

Further, the spiral torsion spring 104 is mechanically coupled to the lock wheel 106. While FIG. 1 depicts the spiral torsion spring 104 and the lock wheel 106 being adjacent, it is contemplated that there can be separation (e.g., gap, other structural component(s) with aligned openings(s) through which a shaft can be positioned, etc.) between the spiral torsion spring 104 and the lock wheel 106 so long as the spiral torsion spring 104 and the lock wheel 106 are mechanically coupled.

The lock wheel 106 has an external surface that includes one or more grooves. Further, the lock hook 108 includes a head. The head of the lock hook 108 can engage and disengage the one or more grooves of the lock wheel 106. The lock wheel 106 is stationary when the head of the lock hook 108 engages one of the one or more grooves of the lock wheel 106. Moreover, the lock wheel 106 is rotatable when the head disengages the one or more grooves of the lock wheel 106.

The lock wheel 106 has an internal surface that defines an opening through the lock wheel 106. A shaft mechanically coupled to a payload (e.g., a hopping actuator, etc.) can be positionable through at least a portion of the opening through the lock wheel 106. When the shaft is positioned through the opening of the lock wheel 106 (or a portion thereof), rotation of the lock wheel 106 is in unison with rotation of the shaft about an axis of the shaft. By way of example, the shaft can be positioned through at least a portion of the opening of the lock wheel 106 and can directly engage the lock wheel 106.

The head of the lock hook 108 and the grooves on the external surface of the lock wheel 106 are geometrically aligned. When the lock hook 108 and one of the grooves of the lock wheel 106 are engaged, such geometrical alignment can prevent creation of a force that acts to disengage the head of the lock hook 108 responsive to an applied force acting on the shaft. Moreover, the lock wheel 106 and the lock hook 108 are made of materials with high ultimate strength, which enables absorption of significant shock loads (e.g., caused by an applied force acting on the shaft). For example, the lock wheel 106 and the lock hook 108 can be made of a steel alloy; however, it is contemplated that other types of materials are intended to fall within the scope of the hereto appended claims.

To initiate tilting, the lock hook 108 is disengaged from the grooves of the lock wheel 106. Thereafter, the tilt servomechanism 102 can rotate the spiral torsion spring 104. The rotation of the spiral torsion spring 104 causes rotation of the lock wheel 106. Moreover, the rotation of the spiral torsion spring 104 causes rotation of the shaft when the shaft is positioned through the opening of the lock wheel 106 (or a portion thereof) and directly engaged with the lock wheel 106 (e.g., the rotation of the lock wheel 106 causes the rotation of the shaft). The rotation of the lock wheel 106 is in unison with the rotation of the shaft about the axis of the shaft. Accordingly, the tilt servomechanism 102 can cause rotation of the shaft when the shaft is directed engaged with the lock wheel 106. During tilting, the spiral torsion spring 104 can provide compliance to prevent damage to the tilt servomechanism 102.

Upon the tilt servomechanism 102 causing the shaft and the lock wheel 106 to reach a desired angular position, the lock hook 108 can engage one of the grooves of the lock wheel 106. When the head of the lock hook 108 is engaged with one of the grooves of the lock wheel 106, an interface between the head of the lock hook 108 and the groove with which the lock hook 108 is engaged can absorb an applied force acting upon the shaft. Further, when engaged, the spiral torsion spring 104 can be deactivated (e.g., compliance is not provided by the spiral torsion spring 104 when the head of the lock hook 108 and the groove of the lock wheel 106 are engaged).

The tilt and lock apparatus 100 further includes a tilt block 110. The tilt block 110 can retain the lock hook 108. While retained by the tilt block 110, the lock hook 108 can be pivoted (e.g., to enable the head of the lock hook 108 to engage and disengage the grooves of the lock wheel 106). Moreover, a structural plate 112 can be attached to the tilt block 110 to prevent the lock hook 108 from sliding out of position (e.g., retaining the lock hook 108 in a channel).

Figure 2:
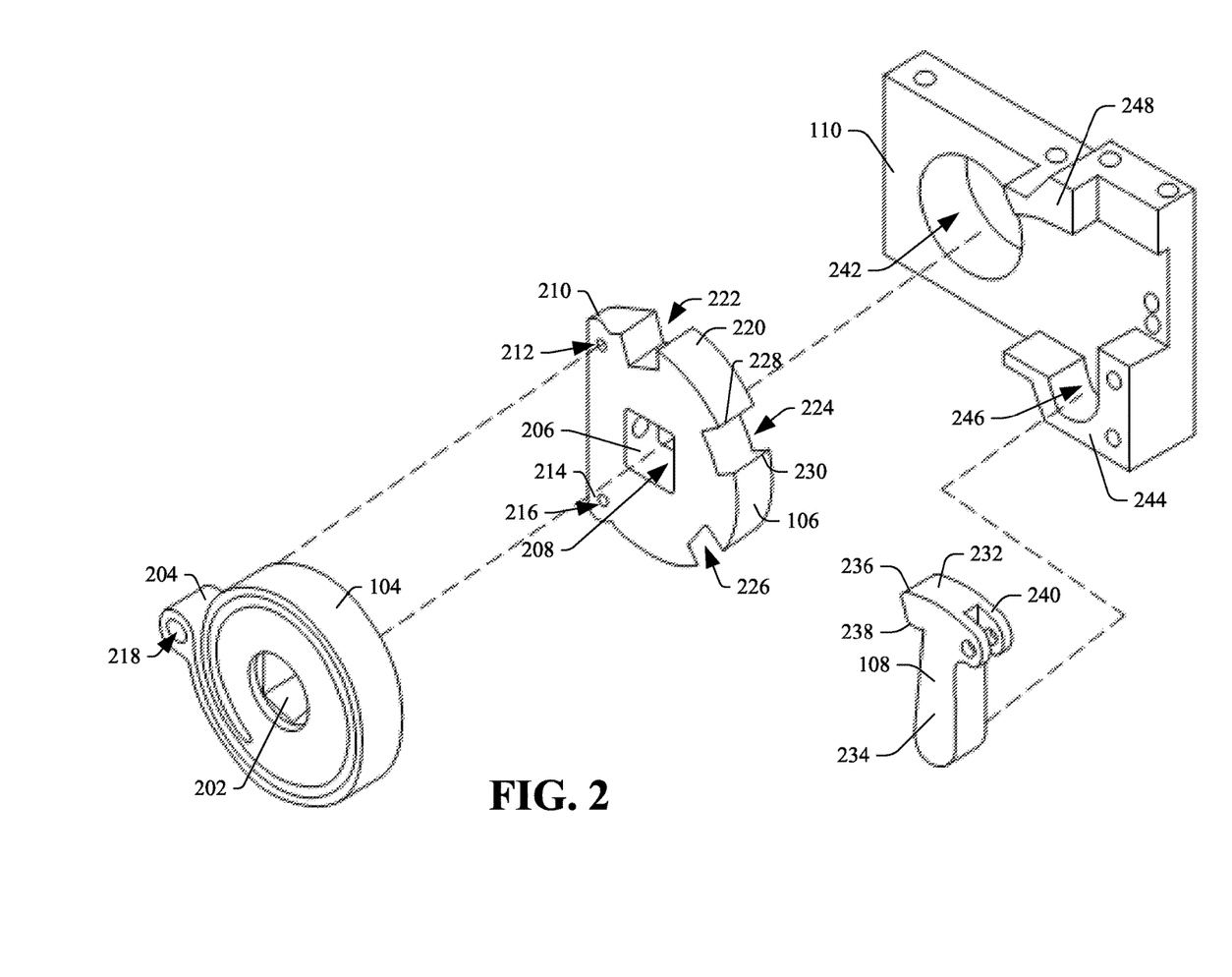
FIG. 2 illustrates an exploded view of a spiral torsion spring, a lock wheel, a lock hook, and a tilt block of the tilt and lock apparatus of FIG. 1.

Reference is now made to FIG. 2, which illustrates an exploded view of the spiral torsion spring 104, the lock wheel 106, the lock hook 108, and the tilt block 110 of the tilt and lock apparatus 100 of FIG. 1. The spiral torsion spring 104 includes an inner end 202 and an outer end 204. The inner end 202 can be mechanically coupled to the tilt servomechanism 102 (e.g., directly coupled to an output shaft of the tilt servomechanism 102). As illustrated, the inner end 202 of the spiral torsion spring 104 can have a pentagon shape (e.g., an output shaft of the tilt servomechanism 102 can have a corresponding pentagon shape to directly engage the inner end 202 of the spiral torsion spring 104); yet, the claimed subject matter is not so limited.

The spiral torsion spring 104 can be a stiff spring. A maximum angular deflection of the outer end 204 of the spiral torsion spring 104 relative to the inner end 202 of the spiral torsion spring 104 can be 30 degrees, for example. According to other examples, the maximum angular deflection of the outer end 204 of the spiral torsion spring 104 relative to the inner end 202 of the spiral torsion spring 104 can be 25 degrees, 20 degrees, or the like.

The lock wheel 106 includes an internal surface 206 that defines an opening 208 through the lock wheel 106. Moreover, the lock wheel 106 includes a lobe 210, which has a hole 212 through the lock wheel 106 (or a portion thereof), and a lobe 214, which has a hole 216 through the lock wheel 106 (or a portion thereof). Further, the outer end 204 of the spiral torsion spring 104 includes a hole 218. The hole 218 of the spiral torsion spring 104 corresponds to the hole 212 of the lock wheel 106. For instance, a connection mechanism such as a pin, a screw, or the like can be positioned through the hole 218 of the spiral torsion spring 104 and the hole 212 of the lock wheel 106 to directly couple the outer end 204 of the spiral torsion spring 104 to the lock wheel 106. Accordingly, the outer end 204 of the spiral torsion spring 104 and the lock wheel 106 can rotate (e.g., about an axis of the shaft) in unison.

According to the embodiment pictured in FIG. 2, a shaft mechanically coupled to a payload can be positioned through at least a portion of the opening 208 through the lock wheel 106. The shaft can be mechanically coupled to the lock wheel 106. More particularly, the shaft can directly engage the internal surface 206 of the lock wheel 106. For instance, the shaft can have a corresponding square shape to directly engage the internal surface 206 of the lock wheel 106 when positioned through at least a portion of the opening 208.

By way of example, the output shaft of the tilt servomechanism 102 can rotate the spiral torsion spring 104. Such rotation of the spiral torsion spring 104 can cause the lock wheel 106 to rotate. Further, the rotation of the lock wheel 106 can cause the shaft mechanically coupled to the payload to rotate. Thus, rotation of the output shaft of the tilt servomechanism 102 drives rotation of the shaft mechanically coupled to the payload, while the spiral torsion spring 104 provides compliance when a large external force (e.g., applied to the payload) causes rotation of the shaft. The compliance provided by the spiral torsion spring 104 helps protect the payload and the tilt servomechanism 102.

The lock wheel 106 further includes an external surface 220 that includes one or more grooves. In the example set forth in FIG. 2, the external surface 220 includes a first groove 222, a second groove 224, and a third groove 226 (collectively referred to herein as grooves 222-226). It is to be appreciated, however, that the claimed subject matter is not limited to three grooves included in the external surface 220 of the lock wheel 106 (e.g., the external surface 220 of the lock wheel 106 can include fewer than three grooves or more than three grooves).

Each of the grooves 222-226 includes a first tapered top edge and a second tapered top edge. For instance, the groove 224 includes a first tapered top edge 228 and a second tapered top edge 230.

Further, the lock hook 108 includes a head 232 and a shank 234. The head 232 of the lock hook 108 includes a first tapered lead edge 236 and a second tapered lead edge 238.

The first tapered lead edge 236, the second tapered lead edge 238, and the tapered top edges of the grooves 222-226 (e.g., the first tapered top edge 228 and the second tapered top edge 230, the tapered top edges of the grooves 222 and 226) are beveled to enable engagement between the head 232 of the lock hook 108 and the grooves 222-226. While being tapered, an interface between the lock hook 108 and the grooves 222-226 of the lock wheel 106 is geometrically aligned so that forces applied to a shaft (e.g., during hopping) do not create forces that act to disengage the head 232 of the lock hook 108 from the grooves 222-226 when engaged.

Moreover, the lock hook 108 includes a lag side 240 of the head 232. The lag side 240 of the head 232 can be mechanically coupleable to a pin as described in greater detail herein. For instance, the pin and the lag side 240 of the head 232 can be mechanically coupled utilizing a connection mechanism such as a pin, a screw, or the like.

The tilt block 110 includes an aperture 242 that passes through the tilt block 110. The tilt lock 110 further includes a support portion 244. The support portion 244 includes a channel 246. An end of the shank 234 of the lock hook 108 can be positioned in the channel 246. The lock hook 108 pivots about the end of the shank 234 positioned in the channel 246 to engage and disengage the head 232 and the grooves 222-226 of the lock wheel 106.

The tilt block 110 further includes a retention portion 248. The lock hook 108 can be retained between the support portion 244 and the retention portion 248. Further, as described above, the structural plate 112 can be attached to the support portion 244 to prevent the lock hook 108 from sliding out of the channel 246 when positioned between the support portion 244 and the retention portion 248.

An amount of backlash between the head 232 of the lock hook 108 and each of the grooves 222-226 can be substantially similar and/or can differ. According to an example, the first groove 222 and the third groove 226 can correspond to operational positions for a hopping actuator of a hopping robotic vehicle (e.g., for associated launch angles), while the second groove 224 can correspond to a home position for the hopping actuator of the hopping robotic vehicle. Thus, the head 232 of the lock hook 108 can engage the first groove 222 or the third groove 226 to deploy the hopping actuator, or the head 232 of the lock hook 108 can engage the second groove 224 to store the hopping actuator. Following this example, a first amount of backlash between the head 232 of the lock hook 108 and the groove 222 when engaged can be less than a second amount of backlash between the head 232 of the lock hook 108 and the second groove 224 when engaged. Further, a third amount of backlash between the head 232 of the lock hook 108 and the third groove 226 when engaged can be less than the second amount of backlash between the head 232 and the second groove 224 when engaged. Moreover, the first amount of backlash and the third amount of backlash can be substantially similar. Yet, it is contemplated that the claimed subject matter is not so limited.

According to an example, a shaft mechanically coupled to a payload can be positionable through the aperture 242 of the tilt block 110. The shaft can further be positionable through at least a portion of the opening 208 through the lock wheel 106. Further, when positioned through at least a portion of the opening 208 through the lock wheel 106, the shaft can directly engage the lock wheel 106. For instance, the opening 208 of the lock wheel 106 can have a square shape, which can be directly engaged by a corresponding square-shaped shaft. Yet, again it is contemplated that substantially any other shape can be utilized.

Again, reference is made to FIG. 1. The tilt and lock apparatus 100 can further includes a pin 114, a coupler 116, an arm member 118, and a locking servomechanism 120. Moreover, the tilt and lock apparatus 100 can include a compression spring as described herein. A first end of the arm member 118 is mechanically coupled to the locking servomechanism 120. Accordingly, the locking servomechanism 120 can drive rotation of the arm member 118 (e.g., towards or away from the lock wheel 106). Further, a second end 122 of the arm member 118 is mechanically coupled to the coupler 116. The coupler 116 can include an aperture 124 that passes there through.

The pin 114 includes a first end that is mechanically coupled to the lag side 240 of the head 232 of the lock hook 108. Moreover, the pin 114 includes a stop 126 on a second end. The pin 114 is slidable through the aperture 124 of the coupler 116. The stop 126 prevents the pin 114 from sliding out of the aperture 124 of the coupler 116.

Moreover, the tilt and lock apparatus 100 includes a support structure 128. The tilt servomechanism 102 and the locking servomechanism 120 can be mounted on the support structure 128, for instance.

Figure 3:
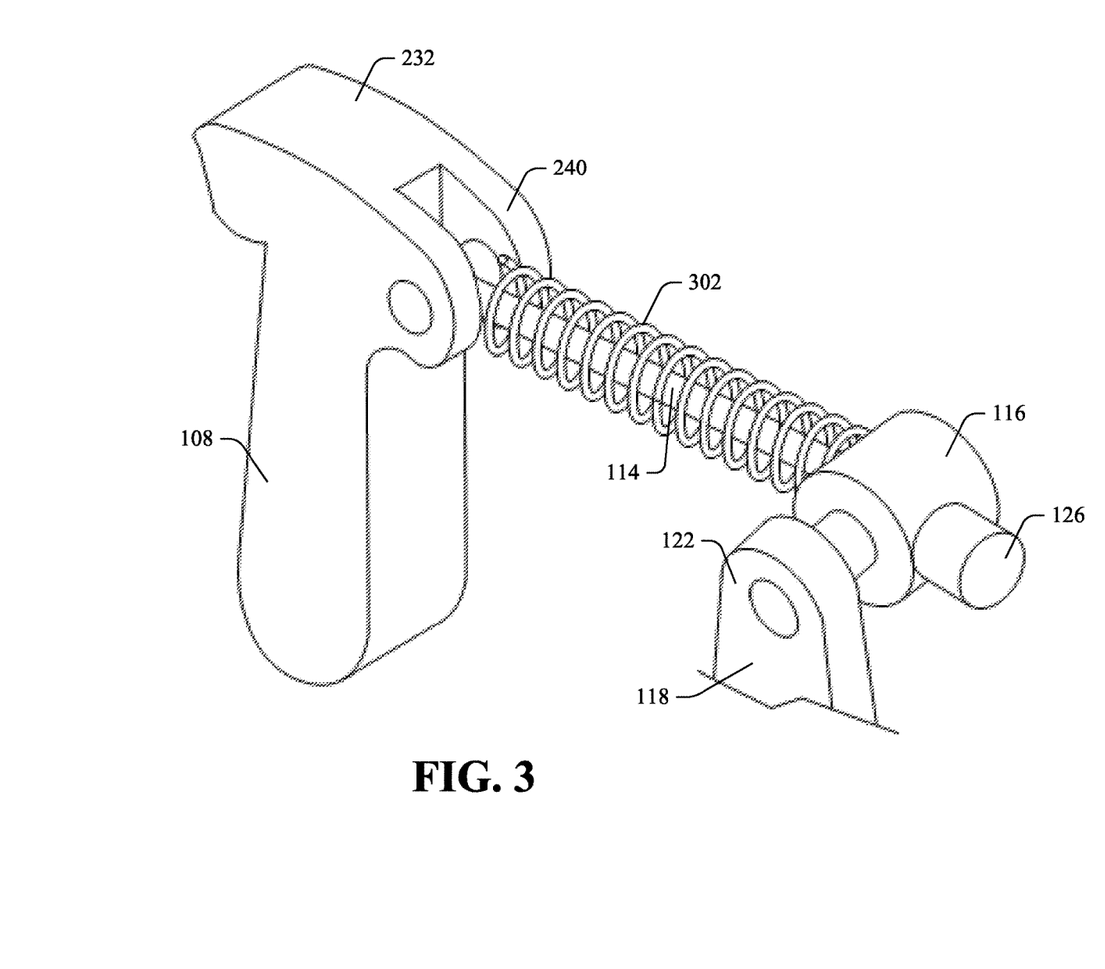
FIG. 3 illustrates an isometric view of a lock hook, a pin, a coupler, and an arm member of the tilt and lock apparatus of FIG. 1.

Turning to FIG. 3, illustrated is an isometric view of the lock hook 108, the pin 114, the coupler 116, and the arm member 118 of the tilt and lock apparatus 100 of FIG. 1. As illustrated in FIG. 3, a compression spring 302 can be wrapped around at least a portion of the pin 114. For instance, the compression spring 302 can be wrapped around at least a portion of the pin 114 between the head 232 of the lock hook 108 (e.g., the lag side 240 of the head 232) and the coupler 116. The compression spring 302 can create a force that acts to engage the head 232 in one of the grooves 222-226 of the lock wheel 106 when the second end 122 of the arm member 118 is rotated towards the lock wheel 106 by the locking servomechanism 120.

According to an example, the locking servomechanism 120 can disengage the head 232 of the lock hook 108 from one of the grooves 222-226 on the external surface 220 of the lock wheel 106 (e.g., by rotating the second end 122 of the arm member 118 away from the lock wheel 106). The tilt servomechanism 102 can rotate the spiral torsion spring 104. Rotation of the spiral torsion spring 104 can cause rotation of the lock wheel 106 and rotation of the shaft, with the rotation of the lock wheel 106 being in unison with the rotation of the shaft about an axis of the shaft. Thereafter, the lock hook 108 and a second one of the grooves 222-226 on the external surface 220 of the lock wheel 106 can be engaged. Such engagement can be caused by the locking servomechanism 120, which rotates the arm member 118 such that the second end 122 moves towards the lock wheel 106, causing the head 232 of the lock hook 108 to engage with the second one of the grooves 222-226.

The compression spring 302 provides compliance to enable engagement of the lock hook 108 with a groove (e.g., one of the grooves 222-226) on the external surface 220 of the lock wheel 106. For instance, engagement of the lock hook 108 and the groove on the external surface 220 of the lock wheel 106 can be initiated (e.g., by the locking servomechanism 120) prior to the lock wheel 106 being rotated to an angular position at which the lock hook 108 and the groove on the external surface 220 of the lock wheel 106 are aligned. Accordingly, the compression spring 302 can cause the head 232 of the lock hook 108 to move into the groove on the external surface 220 of the lock wheel 106 upon the lock wheel 106 reaching the angular position at which the lock hook 108 and the groove are aligned. Thus, the compression spring 302 can cause the lock hook 108 to fully engage the groove of the lock wheel 106 as well as ease timing requirements for engaging the lock hook 108 and the groove of the lock wheel 106.

Reference is again made to FIG. 1. The tilt and lock apparatus 100 can further include one or more sensors. For example, a sensor on the tilt servomechanism 102 can detect movement and/or an angular position of the output shaft of the tilt servomechanism 102. Following this example, the locking servomechanism 120 can use a signal from such sensor to initiate engagement of the lock hook 108 and a groove on the external surface 220 of the lock wheel 106 (e.g., compressing the compression spring 302 as the lock wheel 106 is rotated to the angular position at which the lock hook 108 and the groove on the external surface 220 of the lock wheel 106 are aligned).

By way of another example, the tilt and lock apparatus 100 can include a sensor (or a plurality of sensors) that can detect when the head 232 of the lock hook 108 is fully engaged with a groove on the external surface 220 of the lock wheel 106 or fully disengaged from the grooves on the external surface 220 of the lock wheel 106. Further, the sensor can detect when the head 232 of the lock hook 108 is partially engaged with a groove of the lock wheel 106. Engagement of the lock hook 108 and the lock wheel 106 is designed to be self-binding (e.g., the head 232 of the lock hook 108 is not disengaged from a groove of the lock wheel 106 by rotation of the lock wheel 106); thus, the tilt servomechanism 102 can wait until the sensor detects that the head 232 of the lock hook 108 is fully disengaged from the grooves on the external surface 220 of the lock wheel 106 prior to causing the lock wheel 106 to rotate (e.g., the tilt servomechanism 102 initiates rotation responsive to receiving a signal from such sensor indicating that the head 232 of the lock hook 108 is fully disengaged from the grooves of the lock wheel 106). Moreover, it is desirable to mitigate application of large external loads to a payload (e.g., by activating the hopping actuator) until the head 232 of the lock hook 108 if fully engaged with a groove of the lock wheel 106; accordingly, a payload (e.g., hopping actuator) can be inhibited from being activated until the sensor detects that the head 232 of the lock hook 108 is fully engaged with one of the grooves of the lock wheel 106.

By way of illustration, the sensor that detects when the head 232 of the lock hook 108 is fully engaged, fully disengaged, or partially engaged can be included in the coupler 116. Following this illustration, the pin 114 can include one or more markings that can be detected by the sensor as the pin 114 is slid through the aperture 124. Based at least in part upon the detected markings, the sensor can identify whether the head 232 of the lock hook 108 is fully engaged, fully disengaged, or partially engaged.

Figure 4:
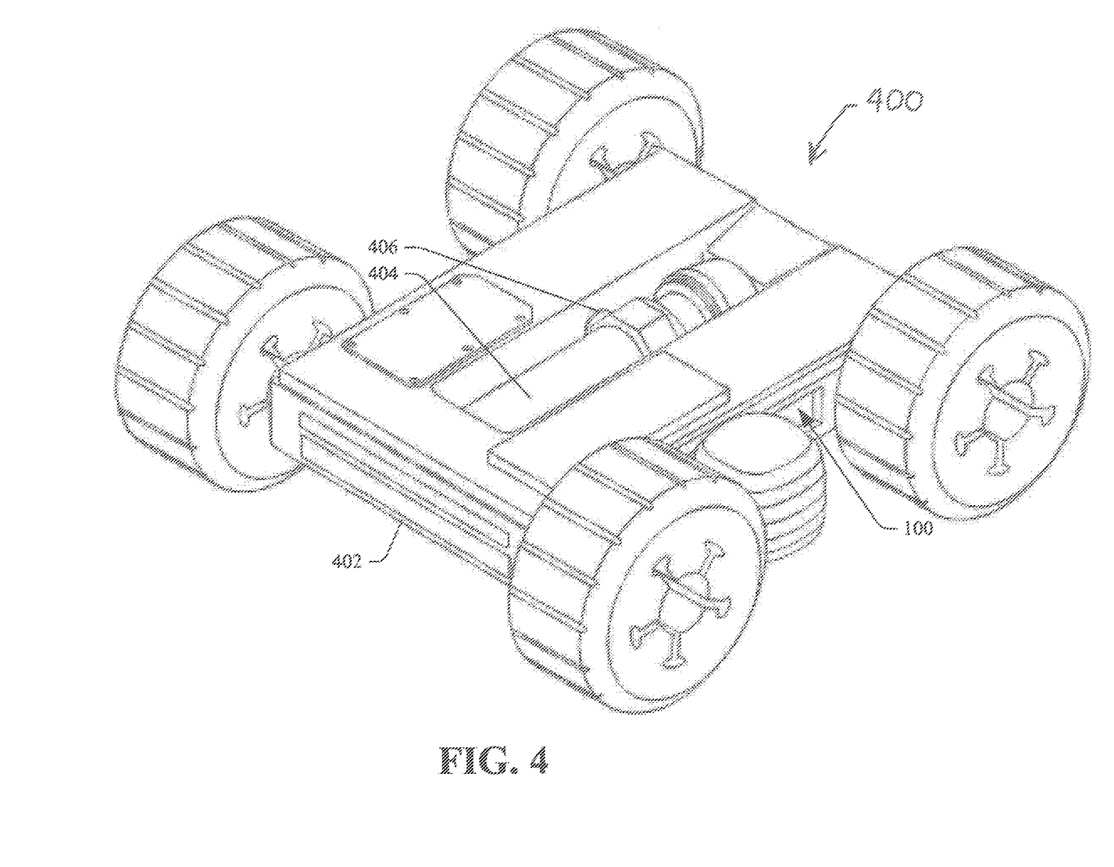
FIG. 4 illustrates an isometric view of an exemplary hopping robotic vehicle that can include the tilt and lock apparatus of FIG. 1.

Turning to FIG. 4, illustrated is an isometric view of an exemplary hopping robotic vehicle 400 that can include the tilt and lock apparatus 100 as described herein. The hopping robotic vehicle 400 is a wheeled vehicle. In the depicted configuration, the hopping robotic vehicle 400 can include two tilt and lock apparatuses; however, it is contemplated that the hopping robotic vehicle 400 can alternatively include one tilt and lock apparatus. Moreover, the hopping robotic vehicle 400 includes a chassis 402, a hopping actuator 404, and two shafts (e.g., a shaft 406 and a disparate shaft). The shafts can be mechanically coupled to the hopping actuator 404 (e.g., the shafts can be connected to the hopping actuator 404, the shafts and the hopping actuator 404 can be integrally formed, etc.).

The tilt and lock apparatus 100 is mounted on the chassis 402 of the hopping robotic vehicle 400. Similarly, the second tilt and lock apparatus is mounted on the chassis 402 of the hopping robotic vehicle 400. Further, the shafts are respectively positioned in the tilt and lock apparatuses, such that the shafts rotate in unison with lock wheels of the tilt and lock apparatuses.

In the example shown in FIG. 4, the hopping actuator 404 is in a home position. The hopping actuator 404 can be stored when in the home position. Such position can correspond to the lock hook 108 being engaged with the second groove 224 of the lock wheel 106; however, the claimed subject matter is not so limited.

Figure 5:
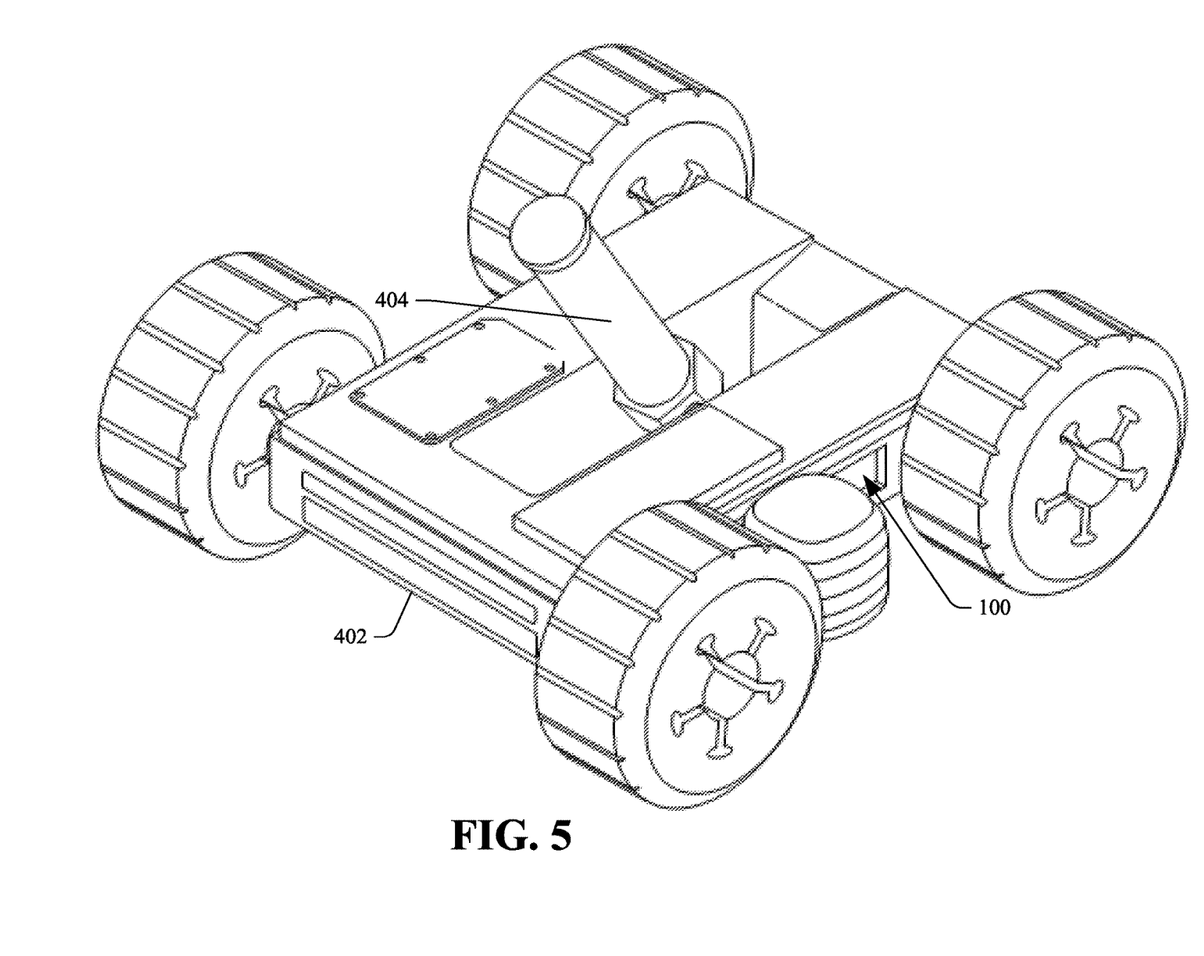
FIG. 5 illustrates another isometric view of the exemplary hopping robotic vehicle.

FIG. 5 illustrates another isometric view of the exemplary hopping robotic vehicle 400. As illustrated in FIG. 5, the hopping actuator 404 has been tilted to an operation position in which the hopping actuator 404 can be deployed. The operation position of the hopping actuator 404 can correspond to the lock hook 108 being engaged with the first groove 222 or the third groove 226 of the lock wheel 106; however, the claimed subject matter is not so limited.

When in the operation position shown in FIG. 5, the hopping actuator 404 can be deployed. A force caused during deployment of the hopping actuator 404 can be imparted on an interface between the lock wheel 106 and the lock hook 108 (e.g., since the head 232 of the lock hook 108 is engaged with the first groove 222 or the third grove 226 of the lock wheel 106). Accordingly, the tilt servomechanism 102 can be protected from such force by the lock wheel 106 and the lock hook 108. Further, the spiral torsion spring 104 is not activated when the lock hook 108 is engaged with the lock wheel 106

When tilting the hopping actuator 404 from the operation position shown in FIG. 5 to the home position shown in FIG. 4, the lock wheel 108 can be disengaged from the grooves 222-226 of the lock wheel 106. Accordingly, the spiral torsion spring 104 can provide compliance in case a large external force is applied to the hopping actuator 404, which thereby imparts an external force on the shaft 406. By having the spiral torsion spring 104 provide compliance during tilting, the tilt servomechanism 102 and the hopping actuator 404 can be protected.

Figure 6:
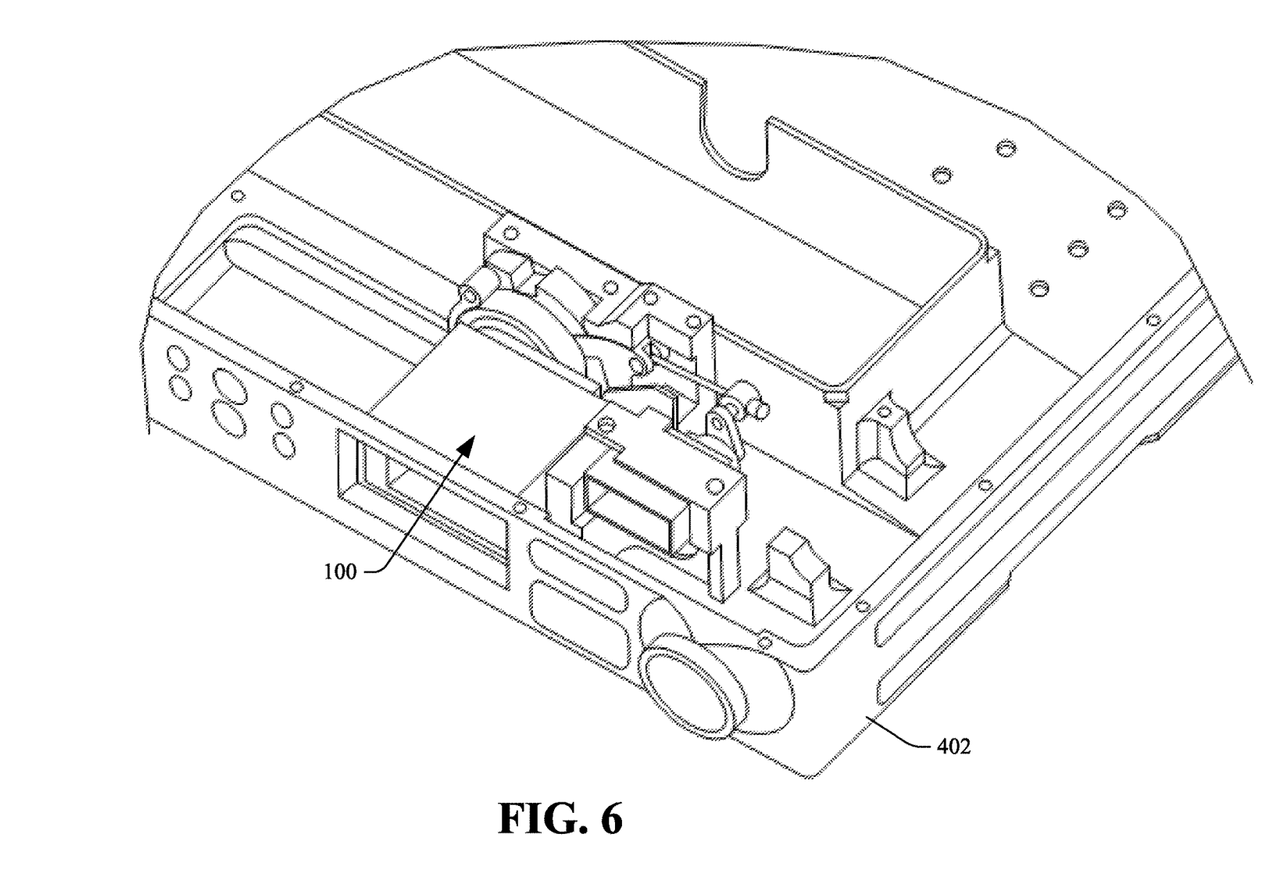
FIG. 6 illustrates a cut-away view of the exemplary hopping robotic vehicle.

Now turning to FIG. 6, illustrated is a cut-away view of the exemplary hopping robotic vehicle 400. FIG. 6 depicts the tilt and lock apparatus 100 mounted on the chassis 402. Although not shown in FIG. 6, a shaft mechanically coupled to a payload (e.g., the shaft 406 mechanically coupled to the hopping actuator 404) can be positionable in the tilt and lock apparatus 100 as described herein. Further, the tilt and lock apparatus 100 can be a removable and replaceable module. Thus, if damaged, the tilt and lock apparatus 100 can be removed from the chassis 402 and a replacement tilt and lock apparatus 100 can be mounted on the chassis 402.

Figure 7:
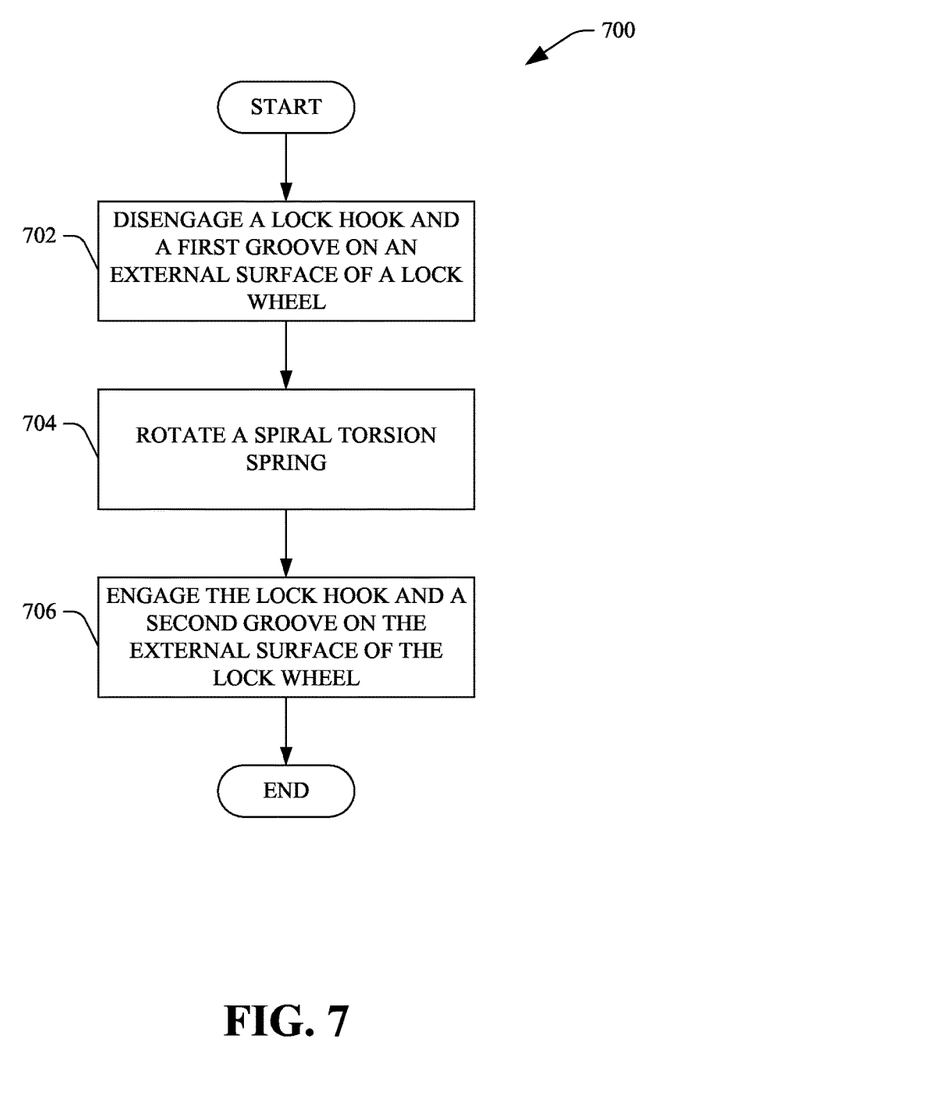
FIG. 7 is a flow diagram that illustrates an exemplary methodology of operating the tilt and lock apparatus of FIG. 1.

FIG. 7 illustrate an exemplary methodology relating to tilting and locking a payload mechanically coupled to a shaft. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

FIG. 7 illustrates a methodology 700 of operating a tilt and lock apparatus. At 702, a lock hook and a first groove on an external surface of the lock wheel can be disengaged. At 704, a spiral torsion spring can be rotated. Rotation of the spiral torsion spring causes rotation of the lock wheel and rotation of a shaft. Further, the rotation of the lock wheel is in unison with the rotation of the shaft about an axis of the shaft. At 706, the lock hook and a second groove on the external surface of the lock wheel can be engaged. Initiation of engagement of the lock hook and the second groove on the external surface of the lock wheel can be prior to the lock wheel being rotated to an angular position at which the lock hook and the second groove on the external surface of the lock wheel are aligned.

According to various embodiments, it is contemplated that a sensor can detect whether the lock hook is fully disengaged from the first groove on the external surface of the lock wheel. Responsive to detecting that the lock hook is fully disengaged from the first groove on the external surface of the lock wheel, the rotation of the spiral torsion spring can be initiated. Moreover, the sensor can detect whether the lock hook is fully engaged with the second groove on the external surface of the lock wheel. By way of example, responsive to detecting that the lock hook is fully engaged with the second groove on the external surface of the lock wheel, a payload (e.g., hopping actuator) can be deployed; yet, the claimed subject matter is not limited to such example.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A tilt and lock apparatus, comprising:
   a tilt servomechanism;
   a spiral torsion spring, comprising:
      an inner end mechanically coupled to the tilt servomechanism; and
      an outer end;
   a lock wheel mechanically coupled to the outer end of the spiral torsion spring, the lock wheel comprising:
      an internal surface that defines an opening through the lock wheel, wherein a shaft is positionable through at least a portion of the opening, and wherein rotation of the lock wheel is in unison with rotation of the shaft about an axis of the shaft;
      an external surface that comprises one or more grooves; and
   a lock hook comprising a head, the head engages and disengages the one or more grooves of the lock wheel, wherein the lock wheel is stationary when the head engages one of the one or more grooves of the lock wheel, and wherein the lock wheel is rotatable when the head disengages the one or more grooves of the lock wheel;
   wherein the external surface of the lock wheel comprising at least a first groove and a second groove from the one or more grooves of the lock wheel, wherein a first amount of backlash between the head and the first groove when engaged differs from a second amount of backlash between the head and the second groove when engaged.

2. The tilt and lock apparatus of claim 1, wherein:
   the head comprises a first tapered lead edge and a second tapered lead edge; and
   each of the one or more grooves comprises a first tapered top edge and a second tapered top edge.

3. The tilt and lock apparatus of claim 1, wherein the head and the one or more grooves are geometrically aligned when engaged to prevent creation of a force that acts to disengage the head responsive to an applied force acting on the shaft.

4. The tilt and lock apparatus of claim 1, further comprising:
   a locking servomechanism;
   an arm member, comprising:
      a first end mechanically coupled to the locking servomechanism; and
      a second end;
   a coupler mechanically coupled to the second end of the arm member, the coupler comprising an aperture; and
   a pin comprising a first end mechanically coupled to a lag side of the head of the lock hook, the pin being slidable through the aperture of the coupler.

5. The tilt and lock apparatus of claim 4, further comprising a compression spring, the compression spring wrapped around at least a portion of the pin.

6. The tilt and lock apparatus of claim 5, the compression spring creates a force that acts to engage the head in one of the one or more grooves when the second end of the arm member is rotated towards the lock wheel by the locking servomechanism.

7. The tilt and lock apparatus of claim 1, wherein a maximum angular deflection of the outer end of the spiral torsion spring relative to the inner end of the spiral torsion spring is 30 degrees.

8. The tilt and lock apparatus of claim 1, the lock hook further comprising a shank, the tilt and lock apparatus further comprising:
   a tilt block, the tilt block comprising:
      an aperture, the shaft being positionable through the aperture; and
      a support portion, the support portion comprising a channel, an end of the shank being positioned in the channel, wherein the lock hook pivots about the end of the shank positioned in the channel to engage and disengage the head and the one or more grooves of the lock wheel.

9. The tilt and lock apparatus of claim 1 comprised by a hopping robotic vehicle.

10. A hopping robotic vehicle, comprising:
    a chassis;
    a hopping actuator;
    a shaft mechanically coupled to the hopping actuator; and
    a tilt and lock apparatus mounted on the chassis, the tilt and lock apparatus comprising:
       a tilt servomechanism;
       a spiral torsion spring driven by the tilt servomechanism;
       a lock wheel mechanically coupled to the spiral torsion spring, the lock wheel comprising:
          an internal surface that defines an opening through the lock wheel, wherein the shaft is positioned through at least a portion of the opening, and wherein rotation of the lock wheel is in unison with rotation of the shaft about an axis of the shaft; and
          an external surface that comprises a first groove and a second groove; and
       a lock hook comprising a head, the head engages and disengages the first groove and the second groove of the lock wheel, wherein the lock wheel is stationary when the head engages one of the first groove or the second groove of the lock wheel, and wherein the lock wheel is rotatable when the head disengages the first groove and the second groove of the lock wheel;
       wherein the head engages the first groove during deployment of the hopping actuator, and wherein the head engages the second groove to store the hopping actuator; and
       wherein a first amount of backlash between the head and the first groove when engaged is less than a second amount of backlash between the head and the second groove when engaged.

11. The hopping robotic vehicle of claim 10, wherein the head is geometrically aligned with the first groove and the second groove when respectively engaged with the first groove and the second groove to prevent creation of a force that acts to disengage the head.

12. The hopping robotic vehicle of claim 10, the tilt and lock apparatus further comprising:
    a pin mechanically coupled to the head of the lock hook;
    a coupler comprising an aperture, the pin being slidable through the aperture of the coupler;
    a compression spring wrapped around at least a portion of the pin between the head of the lock hook and the coupler;
    an arm member mechanically coupled to the coupler; and a locking servomechanism mechanically coupled to the arm member.

13. The hopping robotic vehicle of claim 12, the compression spring creates a force that acts to engage the head in one of the first groove or the second groove when the arm member is rotated towards the lock wheel by the locking servomechanism.

\* \* \* \* \*